United States Patent
Lei et al.

(10) Patent No.: US 11,015,944 B2
(45) Date of Patent: May 25, 2021

(54) METHOD AND APPARATUS FOR DYNAMIC NAVIGATION MODIFICATION

(71) Applicant: FORD GLOBAL TECHNOLOGIES, LLC, Dearborn, MI (US)

(72) Inventors: Oliver Lei, Windsor (CA); Caroline Elizabeth Michaels, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 399 days.

(21) Appl. No.: 15/666,106

(22) Filed: Aug. 1, 2017

(65) Prior Publication Data

US 2019/0041226 A1 Feb. 7, 2019

(51) Int. Cl.
*G01C 21/34* (2006.01)
*G01C 21/36* (2006.01)

(52) U.S. Cl.
CPC ..... *G01C 21/3461* (2013.01); *G01C 21/3617* (2013.01); *G01C 21/34* (2013.01)

(58) Field of Classification Search
CPC .......................... G01C 21/3461; G01C 21/3617
USPC ....................................................... 701/425
See application file for complete search history.

(56) References Cited

U.S. PATENT DOCUMENTS

| | | | |
|---|---|---|---|
| 8,660,794 B2* | 2/2014 | Currie | G01C 21/34 340/905 |
| 9,354,065 B2 | 5/2016 | Ikavalko et al. | |
| 9,689,705 B2* | 6/2017 | Newlin | G01C 21/3676 |
| 2004/0204845 A1* | 10/2004 | Wong | G01C 21/3694 701/431 |
| 2012/0078493 A1* | 3/2012 | Schunder | G01C 21/32 701/117 |
| 2012/0078512 A1* | 3/2012 | Schunder | G01C 21/32 701/446 |
| 2012/0179361 A1* | 7/2012 | Mineta | G01C 21/3469 701/410 |
| 2014/0032114 A1* | 1/2014 | Titus | G01C 21/3453 701/537 |
| 2016/0033293 A1 | 2/2016 | Nobrega | |
| 2016/0325595 A1* | 11/2016 | Wagner | B60G 17/0195 |
| 2017/0262790 A1* | 9/2017 | Khasis | G08G 1/012 |

* cited by examiner

*Primary Examiner* — Khoi H Tran
*Assistant Examiner* — Rodney P King
(74) *Attorney, Agent, or Firm* — Michael Spenner; Brooks Kushman P.C.

(57) ABSTRACT

A system includes a processor configured to receive an instruction to avoid a user-identified route-portion. The processor is also configured to send the route-portion to a remote server. The processor is further configured to receive an updated recommendation relating to a size of the route-portion, responsive to the sending, and calculate a route avoiding the route-portion updated by the recommendation.

17 Claims, 4 Drawing Sheets

METHOD AND APPARATUS FOR DYNAMIC NAVIGATION MODIFICATION

TECHNICAL FIELD

The illustrative embodiments generally relate to methods and apparatuses for dynamic navigation modification.

BACKGROUND

While vehicle navigation systems have existed for decades, recent improvements in both data gathering and communications networks allow for real-time or near-real time identification of slow-downs, construction and traffic backups.

Even with the improved traffic reporting, however, the data is not always completely accurate, and often times a particular incident is demarked on a map with very little data about how to avoid an incident, or for how far construction or traffic extends.

Further, there are a variety of reasons why a user may want to avoid a portion of a route that has nothing to do with traffic or current construction. For example, in certain localities roads tend to be in horrible shape following winter, or could experience heavy flooding after certain precipitation levels. This sort of data is not typically included in route "delay" data, but a local user may know that a certain portion of road is highly undesirable for travel. Or, for example, a portion of road may be unpaved, even for a short stretch, making travel along that road undesirable following rain or snowfall.

SUMMARY

In a first illustrative embodiment, a system includes a processor configured to receive an instruction to avoid a user-identified route-portion. The processor is also configured to send the route-portion to a remote server. The processor is further configured to receive an updated recommendation relating to a size of the route-portion, a responsive to the sending, and calculate a route avoiding the route-portion updated by the recommendation.

In a second illustrative embodiment, a system includes a processor configured to receive a destination. The processor is also configured to retrieve user specified designated areas-of-avoidance from local memory. The processor is further configured to calculate a route to the destination, treating the areas-of-avoidance as untravelable stretches of road for purposes of route calculation and present the calculated route.

In a third illustrative embodiment, a computer-implemented method includes receiving a driver request for route calculation. The method also includes accessing a database of user-designated areas-of-avoidance. The method further includes downloading areas-of-avoidance within a predetermined distance from a vehicle and performing a route determination that includes avoiding travel on the downloaded user-specified areas-of-avoidance.

DETAILED DESCRIPTION

As required, detailed embodiments are disclosed herein; however, it is to be understood that the disclosed embodiments are merely illustrative and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
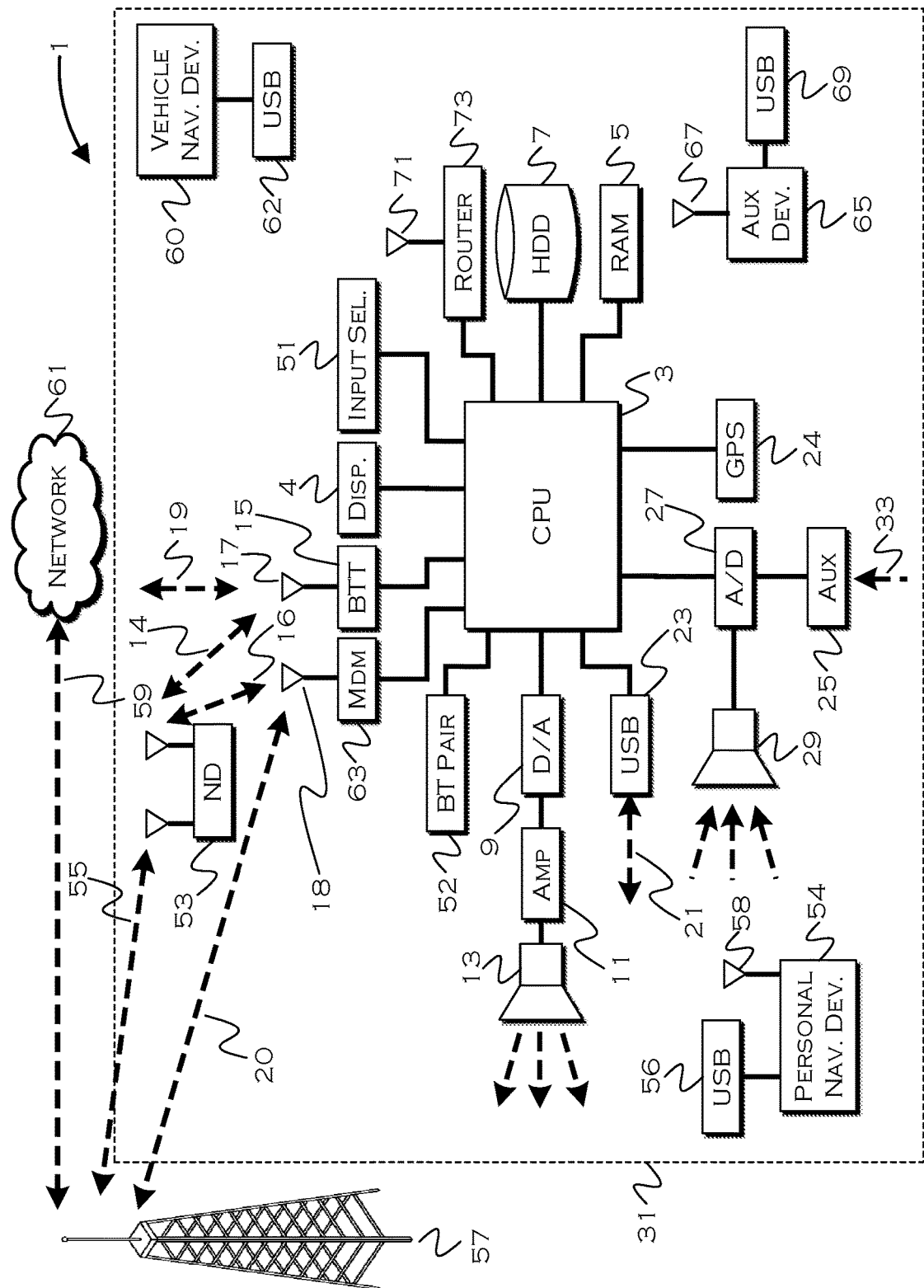
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a Wi-Fi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include Wi-Fi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., Wi-Fi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a Wi-Fi (IEEE 802.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

While modern navigation systems include a number of options to identify ongoing construction and traffic incidents, this data is not always immediately up-to-date and often does not include data relating to the length of delay or length of a back-up. Further, the data almost never includes "bad road" data indicating roads that are often unsuitable or undesirable for travel.

A user may know about such local road conditions, especially persistent conditions such as common flooding, large potholes and unpaved portions. The user could simply choose to avoid these portions of the local roads, but a navigation system may not always intentionally avoid these roads, having no idea the conditions exist. Further, while the user may know about the state of the road, the user does not always know a good option for avoidance, and may turn into a dead-end neighborhood or other unsuitable alternative when trying to avoid areas of concern.

When a user is not from the area where the condition exists, the user may have an even more difficult time avoiding the conditions. The user would likely encounter the condition at least once, before even deciding to avoid the condition, and at that point an initial avoidance may no longer be possible (e.g., there is no turn-off to avoid the condition). In instances such as this, routes taken by other local drivers may be useful in indicating that a poor road condition exists, even if the condition itself is not present on any map data.

By combining crowd-sourcing with observation of localized driving instructions and actions, the illustrative embodiments can profile areas-of-avoidance with fairly reasonable accuracy. By observing the typical areas avoided, and the size of those areas, profiles of "bad" road conditions can be built, and while this is essentially an assumption about road conditions, the fact that a threshold percentage of drivers chooses to avoid an area, even if it would otherwise be the fastest route, typically indicates that there is something wrong with that area.

In the illustrative examples, the user can mark areas of avoidance (e.g., when the user encounters potholes) and the local navigation system can treat those as "non-roads" or otherwise avoid using the marked areas in any route calculation. This could persist until the user unmarked the roads (the roads were repaired). In a less user-interactive manner, the vehicle could detect certain poor road conditions and mark those areas on a local map, and recommend avoiding those areas in future navigation. If a user is observed continuously traveling over a marked or recommended-avoidance area, the system can "unmark" the area, assuming that either the problem is fixed or the user simply does not care. The navigation system can also use the "non-road" marked areas for routing if, for example, no route exists that does not use that area.

Figure 2:
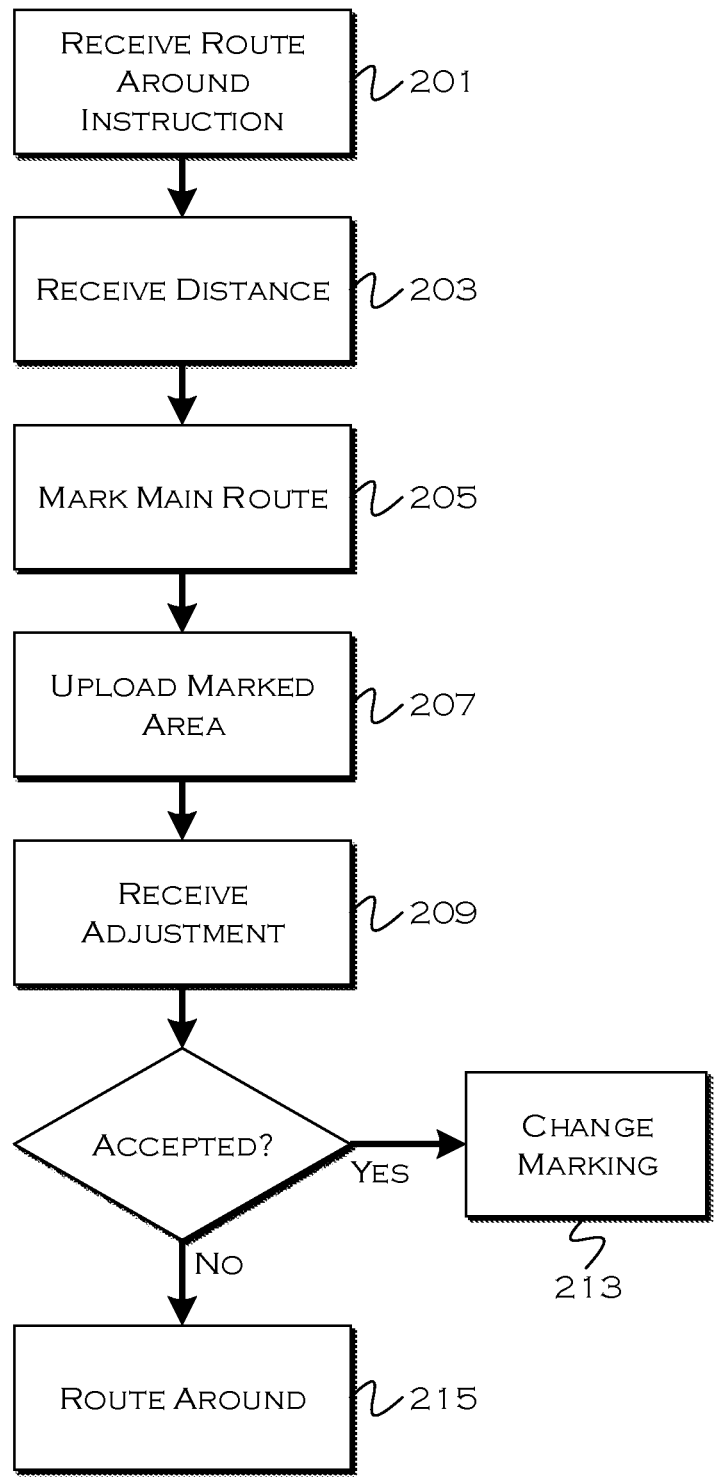
FIG. 2 shows an illustrative process for route deviation.

FIG. 2 shows an illustrative process for route deviation. In this illustrative example, the process receives 201 an instruction to route around a particular area. This could be in the form of a selection of an area of avoidance on a map, an affirmative response to a route around recommendation, or even detectable based on a repeated user-deviance around a particular stretch of a route (even a few consistent instances of deviance would likely suggest a problem on a portion of the route). Another example of receiving an instruction to deviate around an area would simply be if a user goes off-route or off-route for more than a certain distance or time.

The process also receives 203 a distance for the route-around. If the user specified a particular portion of a map to avoid, the distance would be whatever route allowed for re-entry as soon as the marked area was avoided. In other examples, the distance may be discrete (e.g., avoid the next two miles of a road). In still other examples, the distance may be based on typical avoidance maneuvers observed based on consistent user behavior to avoid the route portion (e.g., when and where the user typically re-enters the original route).

The process then locally stores 205 a marked version of a map, which indicates the area to be avoided in future navigation. This allows the user to at least avoid the specified area in future routing recommendations, without the user having to remind the system to avoid the portion or electively avoid the portion because a route still goes through the portion.

Also, in this example, the process uploads 207 the marked portion to a cloud server. This can serve at least two functions. First, this allows the marked data to be provided to a large group of users, as part of a crowd-sourced analysis of localized road-data. This can help other users, who may not be familiar with an area, know what areas of road are avoided by locals.

Another useful aspect of uploading the data is that the server can compare the marked portion to portions received from other vehicles, to determine if the route around is insufficient or overly aggressive. That is, if a 2 mile stretch of road contains significant potholes, and a user only avoids 1.5 miles of the road, the system can use crowd sourced data to inform the individual user that the route around (if to avoid potholes) needs to be larger. On the other hand, if the user were avoiding 4 miles of the road, and taking a slower route as a result, the process could tell the user that only 2 miles of the road need be avoided based on observed and instructed behavior from other drivers in the area.

The process receives 209 any adjustments or recommendations and offers the modifications to a driver. If the driver accepts 211 the proposed modification to the route-around, the process changes 213 the local marking of the map to reflect the improved data. Then the process can recalculate 215 a route that avoids the particular areas. The modification capability could be especially useful for an out-of-town driver, who may hit a stretch of potholes and ask for a large avoidance area for what is actually a very localized problem. If a vehicle could detect potholes or other undesirable road characteristics, the vehicle could detect one or two potholes in close succession and dynamically request a route-around from the cloud on this basis, without any explicit instruction from a driver. The cloud could then collect user observed and indicated behavior from other local drivers to determine if this portion of road were commonly avoided, and for what distance.

It is worth noting that the avoidance process can be done in an entirely local manner, without reference to crowd-sourced data, if desired. For example, a user could request avoidance of a dirt road, or area of construction, and the local navigation system can treat this section as impassible (at least for navigation calculation purposes) for either a certain amount of time or until the user indicates otherwise.

Figure 3:
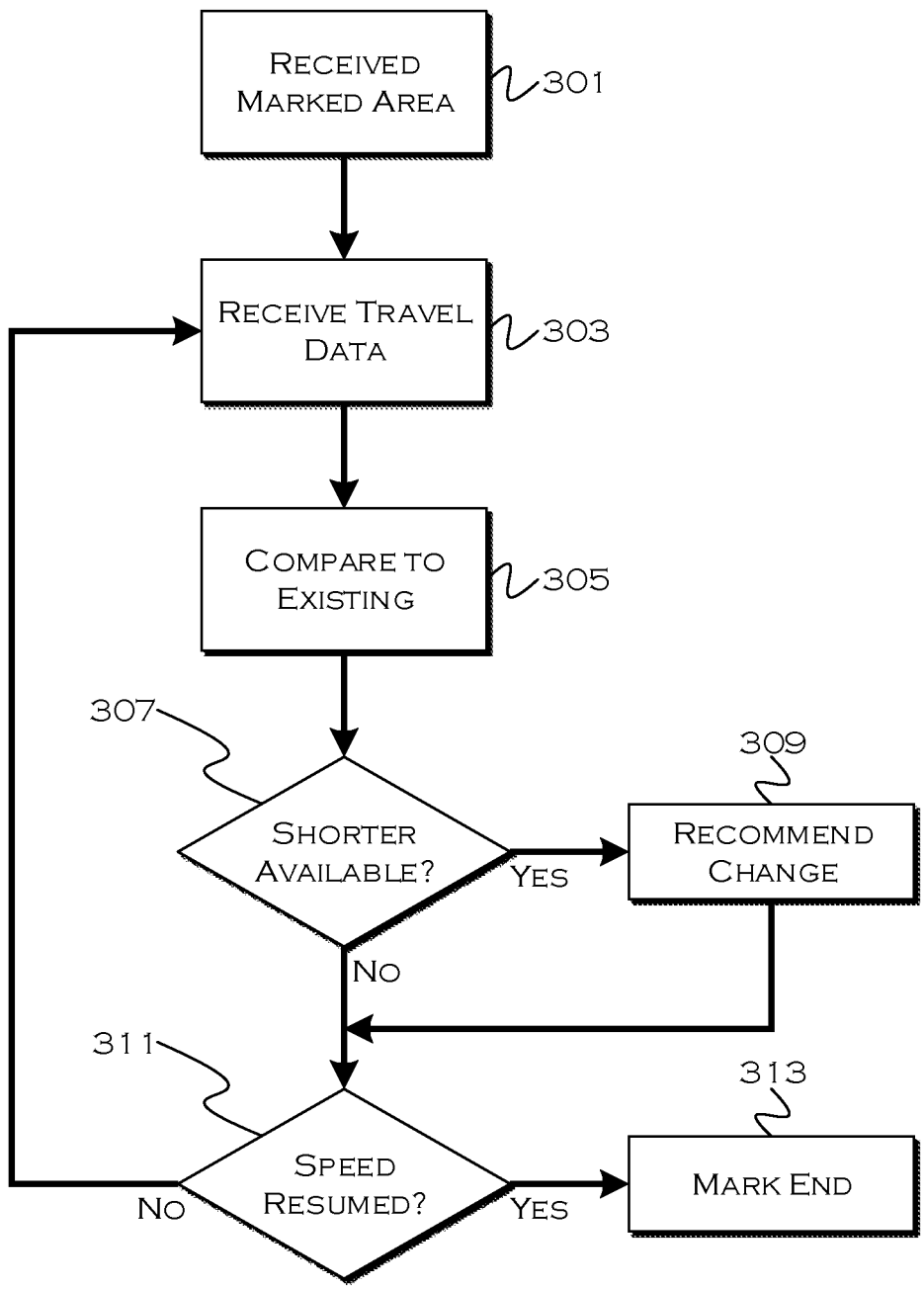
FIG. 3 shows an illustrative process for route recommendation.

FIG. 3 shows an illustrative process for route recommendation. In this example, the process can receive 301 one or a plurality of marked areas, user-designated for route avoidance. These areas can be aggregated as received from vehicles, in order to build a tailored model of areas of avoidance for any locality.

In addition to modeling the received requested areas-of-avoidance, the process could receive data indicating at what point a user ceases avoidance (re-enters a road or route). This can help define an "end" to an area, and a large enough data set can serve to define a preferred area of re-entry for users who may not be familiar enough with the area-of-avoidance to accurately specify when to end the avoidance.

Also, in this example, the process receives 303 vehicle travel data, which, in this example, at least indicates where a vehicle intends to re-enter a route. The current received re-entry point could be based on, for example, the size of a user-specified area-of-avoidance or could be based on any other reasonable factor accommodated by the user's on-board navigation system.

The process compares 305 the current avoidance plan and re-entry point to a known existing profile for the area-of-avoidance. This known existing profile is based on, for example, crowd-sourced data gathered as discussed above. Other data sources, such as municipal data sources or traffic feeds could also be used to define the size of a particular area-of-avoidance with some degree of precision.

If a shorter option for avoidance (one that re-enters the route sooner and is likely faster) exists 307, the process can send 309 a recommended change to the vehicle that originally sent the route-around data. This can be an ongoing and dynamic process, such that the received travel data includes the current vehicle location and speed for as long as a route-around exists. If or when the vehicle re-enters the route or resumes a speed (depending on what is being tracked) 311, the process can mark 313 the end of a detour. Otherwise, the process continues to receive travel data which can both indicate when the vehicle re-enters a route and whether or not the re-entry point was actually an appropriate one (based on observing driver behavior following re-entry).

An illustrative example of the preceding, using drivers/vehicles A, B and C, follows. All three vehicles are attempting to avoid a 2 mile stretch of road for one or more reasons such as traffic, road conditions, etc., which is currently logged as a 2 mile stretch in the cloud server. All three vehicle drivers witness the traffic and request a route-around, with driver A specifying 1.5 miles, driver B specifying 2.5 miles, and driver C specifying 2 miles.

Since the cloud has the area-of-avoidance currently set at two miles, the cloud recommends that driver A's navigation process only route around 2 miles, and the same for driver B. Both drivers accept the recommendation. Driver A reaches the area first, and begins to avoid the area. While driver A is driving, the remote process is receiving driver A travel data and can update the recommendations (the same for drivers B and C).

Driver A re-enters the original route after 2 miles, and encounters additional traffic for 0.2 more miles. Accordingly (and likely based on more than one simple instance of data), the remote process can update the size of the area-of-avoidance to 2.2 miles. Since the communication with B and C is still ongoing, the process can dynamically recommend a change to the routes of B and C so that now 2.2 miles is avoided. B does not accept the change and C does.

Driver B, the next to reach the detour, actually re-enters the original route at 1.7 miles, choosing to use a locally displayed map to figure out how to re-enter the route sooner. Driver B encounters no traffic at this point, or at any other point along the route after re-entry. The remote process now updates the size of the area-of-avoidance and issues another recommendation to driver C.

This example shows how the areas can be dynamically adjusted as vehicles travel, and how the communication can generally work to improve the driving experience. If the same three vehicles traveled the same route the next day, they would have local data sets corresponding to the last received area size (2 miles for A, 1.7 miles for B, 1.7 miles for C) in case continued avoidance was desired (and if the previous avoidance reason related to a condition, such as road-state, that persisted). While traffic delay size may not be a consistent daily obstacle, similar concepts can be used for poor travel conditions over a stretch of road, which may persist over time.

In some instances, it may not be possible to determine particularly precise endpoints based on re-entry of a route, since conditions like potholes may not be detectable consistently (or even at all) in certain vehicles. Accordingly, in some cases, with sufficient data, the size of a stretch of consistent poor road conditions may be determined based on the range of points at which a person requests a re-route. In those examples, the process "assumes" that people request re-routes when a significant portion of damaged or bad road remains, so the trailing data points (the furthest points down the stretch where re-routing is requested) tend to indicate the "end point" beyond which the road is no longer bad enough to warrant re-routing. By using this sort of data analysis, a fairly accurate model representing at least the worst portions of a bad stretch of road can be determined and built.

It is also possible to receive or determine particular conditions associated with a stretch of road, for example, based on a variety of data. Explicit identification of a condition will provide the most accurate data, but if, for example, all vehicles except for SUVs avoid a portion of road, the conditions likely relate to conditions improper for standard vehicles but fine for SUVs. In another example, low branches over a route may cause all SUVs and vans to avoid the route, but not regular vehicle drivers. While it may not be possible to precisely pinpoint the issue without additional data, even data such as this could be used to tailor the recommendations to a vehicle class. Additional data (camera, radar, lidar, etc) could be used to more accurately model an actual condition experienced.

Figure 4:
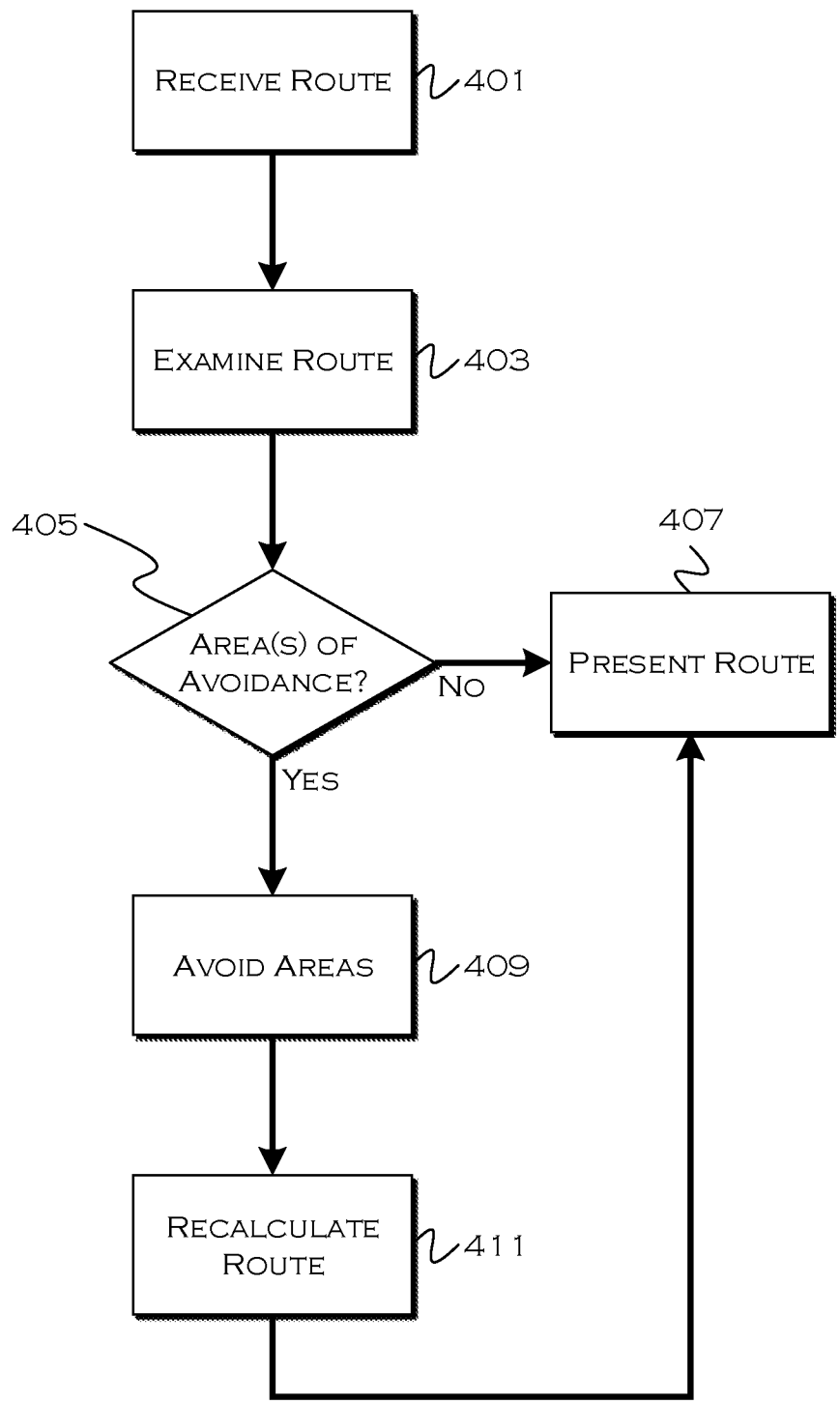
FIG. 4 shows an illustrative process for route calculation.

FIG. 4 shows an illustrative process for route calculation. In this example, the process receives 401 a destination input or an already calculated route. Here, the consideration is with regards to an already existing route, but a similar process could be executed during route formation if the process received a destination, by using a "preferred" route with no detours as a base route.

The process examines 403 the route to see if 405 the route includes any marked areas-of-avoidance (user-marked or crowdsourced, for example). If there are marked areas, the process can treat 409 those areas as "non-roads" or impassible roads and recalculate 411 the route. The process can then present 407 the route to the user.

In an alternative approach, a navigation route calculator determining an initial route can simply treat any marked areas as non-roads or impassible areas, and thus the initial route can reflect and desired, persistent areas of avoidance.

Since it may be the case that a route becomes impossible without including at least one area-of-avoidance, or a route becomes overly onerous (such as deviating from a preferred no-avoidance route by more than a threshold time or distance), the processes can always "turn off" some or all of a portion of avoidance in order to determine at least one passable route to a destination that falls within an acceptable or specified parameters (time/distance/fuel/etc.).

In still other examples, drivers could specify what types of persistent conditions (potholes, flooding, low trees, etc) should be avoided, and then a vehicle could request data identifying those conditions in a local area to be used when formulating directions within the local area. This data could be updated as a vehicle travels as well, so that data can be presented in an updated and on-demand manner as the data is needed by a driver.

The illustrative embodiments allow users to designate and consistently avoid certain roads, with the data being improved for those users through crowd-sourcing and being supplied to less sophisticated users in a similar manner.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A system comprising:
a processor configured to:
receive an instruction to avoid a user-identified route-portion, the user-identification including a user selecting a section of a road to be avoided on a digital map;
send the section of the road to a remote server;
responsive to the sending, receive an updated recommendation relating to a size of the section of the road such that the recommendation includes recommending avoiding a different distance of the user-selected section of road to create an updated section of road different than the section marked by a user, based on crowdsourced data indicating that other drivers are electing to a different distance of the road including the marked section; and
calculate an updated route avoiding the updated section of the road.

2. The system of claim 1, wherein the instruction includes an explicit selection of a map portion, including a plurality of road sections that are marked as a result of selection of the map portion, displayed in a vehicle, to avoid.

3. The system of claim 1, further comprising automatically marking sections of road, on which a vehicle is traveling, as sections of road to be avoided, responsive to detection of user-defined unfavorable driving conditions based on vehicle sensed driving conditions.

4. The system of claim 1, wherein the processor is configured to receive a first reason for the avoiding and to include the reason in the sending, and wherein the recommendation is based on behavior of other drivers that the crowdsourced data indicates elected to avoid the different distance of the road including the marked section for a second reason the same as the first reason.

5. The system of claim 4, wherein the processor is configured to receive the first reason as user-input.

6. The system of claim 4, wherein the processor is configured to determine a candidate first reason as the reason based on vehicle sensor data.

7. The system of claim 1, wherein the processor is further configured to save the user-identified route-portion and an avoidance reason in local memory for use by future route calculations.

8. The system of claim 1, wherein the processor is configured to save the route-portion updated by the recommendation in local memory for use by future route calculations.

9. A system comprising:
a processor configured to:
receive a destination;
retrieve user specified designated areas-of-avoidance from local memory, defining sections of road designated to be avoided by a user;
calculate a route to the destination, treating the areas-of-avoidance as untravellable stretches of road for purposes of route calculation; and
present the calculated route.

10. The system of claim 9, wherein the processor is configured to request updates for the areas-of-avoidance from a remote system.

11. The system of claim 10, wherein the processor is configured to receive updated boundaries for an area-of-avoidance from a remote system and save an updated version of the area-of-avoidance.

12. The system of claim 9, wherein the processor is configured to determine that no route to the destination exists and to responsively treat at least one area-of-avoidance as travelable for purposes of route calculation.

13. A computer-implemented method comprising:
receiving a driver request for route calculation;
accessing a database of user-designated areas-of-avoidance;
downloading areas-of-avoidance within a predetermined distance from a vehicle; and
performing a route determination that includes treating the areas-of-avoidance as untravellable stretches of road for purposes of route determination.

14. The method of claim 13, further comprising:
repeating the accessing and downloading as the vehicle travels, and repeating the performing such that the route determination modifies a previously calculated route to avoid any newly downloaded areas-of-avoidance downloaded by repeating the downloading.

15. The method of claim 13, further comprising downloading areas-of-avoidance having a specified condition associated therewith.

16. The method of claim 15, wherein the performing comprises performing a route determination that includes only treating as untravellable the downloaded user-designated areas-of-avoidance that also have the specified condition associated therewith.

17. The method of claim 15, wherein the specified conditions include at least one of potholes or flooding.

* * * * *